United States Patent
Shotey et al.

(10) Patent No.: US 8,106,295 B1
(45) Date of Patent: Jan. 31, 2012

(54) APPARATUS AND METHOD FOR COLLAPSIBLE AND EXPANDABLE ELECTRICAL DEVICE COVER

(75) Inventors: Marcus J. Shotey, Scottsdale, AZ (US); Jeffrey P. Baldwin, Phoenix, AZ (US); Iven Dieterle, Tempe, AZ (US)

(73) Assignee: TayMac Corporation, Gilbert, AZ (US)

( * ) Notice: Subject to any disclaimer, the term of this patent is extended or adjusted under 35 U.S.C. 154(b) by 231 days.

(21) Appl. No.: 12/695,985

(22) Filed: Jan. 28, 2010

Related U.S. Application Data

(60) Provisional application No. 61/147,946, filed on Jan. 28, 2009.

(51) Int. Cl.
*H02G 3/14* (2006.01)

(52) U.S. Cl. ............... 174/66; 174/67; 439/135; 33/528

(58) Field of Classification Search .................... 174/66, 174/67; 220/241, 242; 439/135; 33/528
See application file for complete search history.

(56) References Cited

U.S. PATENT DOCUMENTS

| | | | |
|---|---|---|---|
| 3,666,134 A | 5/1972 | Rauch | |
| 5,218,169 A | 6/1993 | Riceman | |
| 5,245,507 A | 9/1993 | Ericksen | |
| 5,280,135 A | 1/1994 | Berlin et al. | |
| 5,317,108 A | 5/1994 | Prairie, Jr. | |
| 5,621,192 A | 4/1997 | Bordwell et al. | |
| 6,825,413 B2 * | 11/2004 | Jeon et al. | 174/50 |
| 6,848,916 B2 * | 2/2005 | Nakayama et al. | 439/76.2 |
| 6,979,777 B2 | 12/2005 | Marcou et al. | |
| 7,134,883 B2 * | 11/2006 | Werner et al. | 439/76.1 |
| 7,259,328 B1 | 8/2007 | Gretz | |
| 7,304,238 B1 | 12/2007 | Shotey et al. | |
| 7,388,758 B2 * | 6/2008 | Chen et al. | 361/801 |
| 7,485,804 B2 * | 2/2009 | Dinh et al. | 174/50 |
| 7,572,976 B1 * | 8/2009 | Merrill | 174/50 |
| 2006/0191702 A1 | 8/2006 | Dinh | |

* cited by examiner

*Primary Examiner* — Dhirubhai R Patel
(74) *Attorney, Agent, or Firm* — Booth Udall, PLC

(57) ABSTRACT

An electrical device cover having a base with a wall structure includes of at least a two pairs of opposing walls located perpendicular to each other and an opening in a back side large enough to receive an electrical device. An exterior surface of at least a first wall has at least one rails running perpendicular to a plane in which the back side of the base resides and the base of a detachable hinge component is slidably coupled to the at least one rail. The detachable hinge component further includes at least one hinge member that is parallel to the base of the hinge component and a lid includes at least one hinge tab in which the at least one hinge member seats such the lid is pivotally coupled to the hinge component.

21 Claims, 8 Drawing Sheets

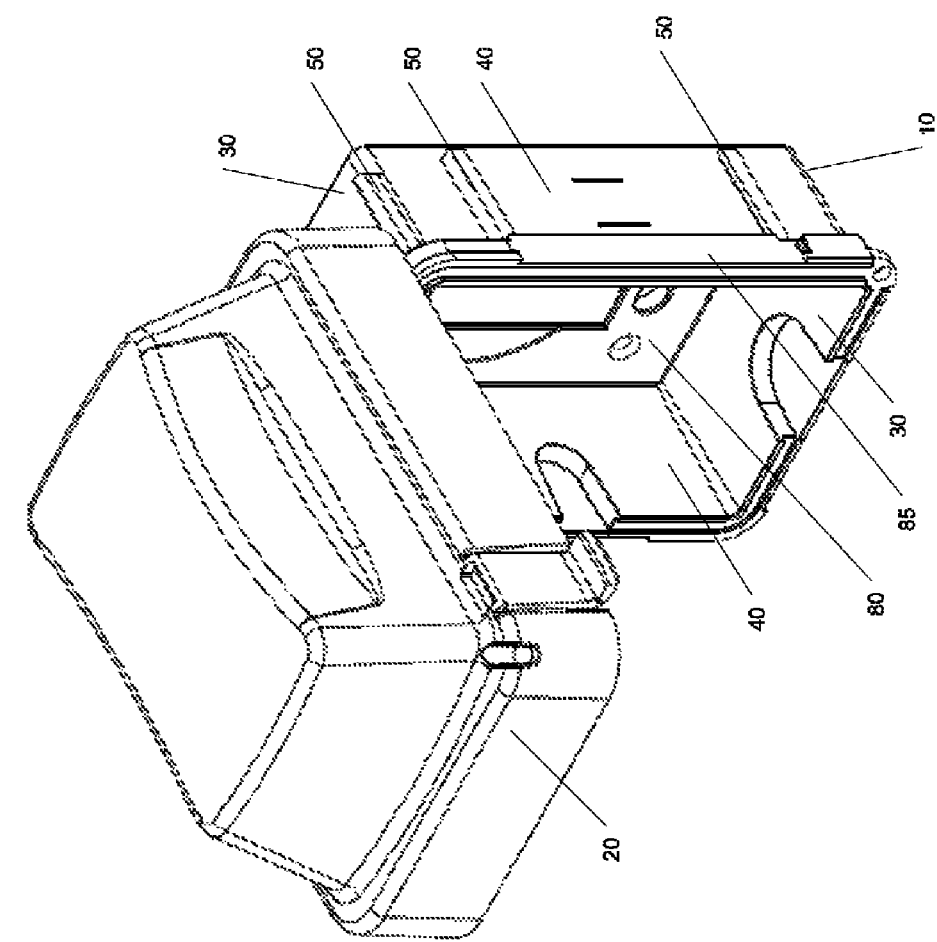
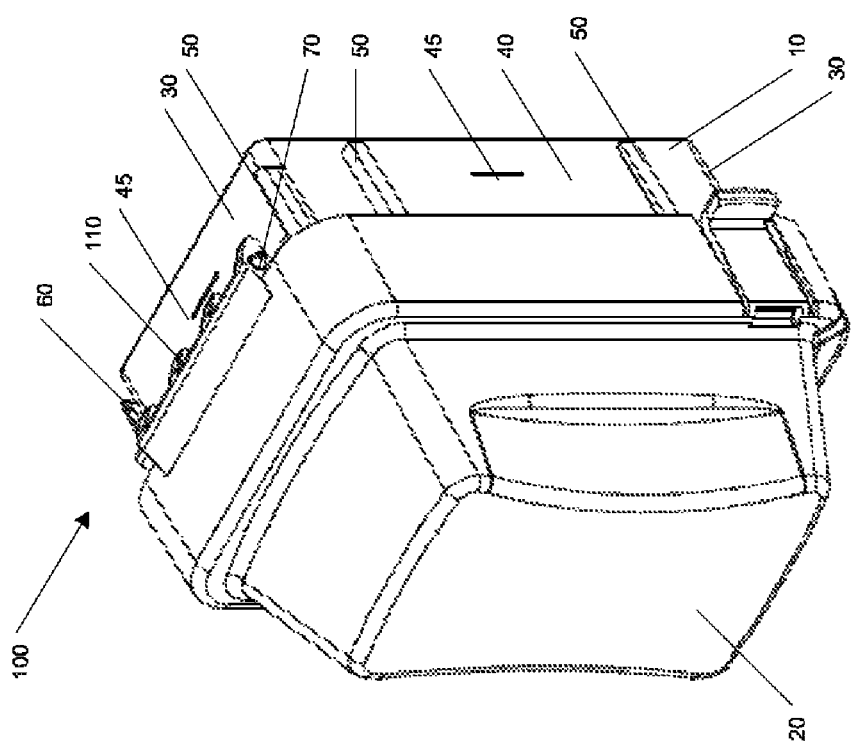
FIG. 1B
FIG. 1A

APPARATUS AND METHOD FOR COLLAPSIBLE AND EXPANDABLE ELECTRICAL DEVICE COVER

CROSS REFERENCE TO RELATED APPLICATION

This document claims the benefit of the filing date of U.S. Provisional Patent Application Ser. No. 61/147,946, entitled "Collapsible/Expandable Cover" to Marcus Shotey, et al. which was filed on Jan. 28, 2009, the contents of which is hereby incorporated herein by reference.

BACKGROUND

1. Technical Field

Aspects of this document relate generally to electrical device covers.

2. Description of Related Art

Electrical device covers are conventionally used to protect electrical devices from water and other contaminants, prevent access to electrical wires, and/or provide a particular decorative look to an installed electrical device. Conventional electrical device covers may include a variety of components, such as bases and lids, and may be mounted in a variety of orientations, such as horizontal or vertical. Electrical device covers may be used in a variety of locations, including interior/exterior walls or recessed within a wall or other structure.

SUMMARY

In an aspect, an electrical device cover may comprise a base having a wall structure comprised of at least a first pair of opposing walls and a second pair of opposing walls located perpendicular to the first pair of opposing walls and an opening in a back side large enough to receive an electrical device. The device further comprises at least one rail on an exterior surface of at least one of the first pair of opposing walls, the at least one rail running perpendicular to a plane in which the back side of the base resides and a detachable hinge component having a base that is slidably coupled to at least one of the rails, the detachable hinge component further comprising at least one hinge member that is parallel to the base of the hinge component. A lid comprises at least one hinge tab in which the at least one hinge member seats such the lid is pivotally coupled to the hinge component.

Particular implementations may include one or more of the following. At least one stop on an exterior surface of the at least one of the first pair of opposing walls may run parallel to a plane in which the back side of the base resides. When the base of the detachable hinge component is slidably coupled to the at least one rail and rests against a front lip of the base, the lid is pivotable through the hinge member with respect to the base between an open position and an expanded closed position. When the base of the detachable hinge component is slidably coupled to the at least one rail and located in a proximal position relative to the back side of the base of the electrical device cover, the lid is pivotable through the hinge member with respect to the base between an open position and a collapsed closed position.

The electrical device cover may further comprise at least one rail on an exterior surface of at least one of the second pair of opposing walls, the at least one rail running perpendicular to the plane in which the back side of the base resides. When the base of the detachable hinge component is slidably coupled to the at least one rail and rests against a front lip of the base, the lid is pivotable through the hinge member with respect to the base between an open position and an expanded closed position.

The lid may further comprise a latch component that mates with a latch component on the base to secure the lid in a closed position.

When the base of the detachable hinge component is slidably coupled to the at least one rail on the outer surface of one of the first pair of opposing walls and the detachable hinge member is located between the front lip of the base and the plane in which the back side of the base resides, the lid is pivotable through the hinge member with respect to the base between an open position and a closed position that is between an expanded closed position and a collapsed closed position. When the base of the detachable hinge component is slidably coupled to the at least one rail on the outer surface of one of the second pair of opposing walls and the detachable hinge member is located between the front lip of the base and the plane in which the back side of the base resides, the lid is pivotable through the hinge member with respect to the base between an open position and a closed position that is between an expanded closed position and a collapsed closed position.

When the base of the detachable hinge component is slidably coupled to two rails on the outer surface of one of the first pair of opposing walls, the lid is pivotable through the hinge member with respect to the base between an open position and a closed position that is between an expanded closed position and a collapsed closed position. When the base of the detachable hinge component is slidably coupled to two rails on the outer surface of one of the second pair of opposing walls, the lid is pivotable through the hinge member with respect to the base between an open position and a closed position that is between an expanded closed position and a collapsed closed position.

In another aspect, an electrical device cover, comprises a base having a wall structure comprised of at least a first pair of opposing walls and a second pair of opposing walls located perpendicular to the first pair of opposing walls and an opening in a back side large enough to receive an electrical device. The device cover further comprises at least a first rail on an exterior surface of at least one of the first pair of opposing walls, the at least first rail running perpendicular to a plane in which the back side of the base resides and at least a second rail on an exterior surface of at least one wall that is perpendicular to the at least one of the first pair of opposing walls, the at least second rail running perpendicular to a plane in which the back side of the base resides. The device further comprises a detachable hinge component having a base that is slidably couplable to the least first rail and the at least second rail, the detachable hinge component further comprising at least one hinge member that is parallel to the base of the hinge component and a lid comprising at least one hinge tab in which the at least one hinge member seats such the lid is pivotally coupled to the hinge component.

Particular implementations may include one or more of the following. When the base of the detachable hinge component is slidably coupled to the at least first rail of the at least one of the first pair of opposing walls and the hinge component is located proximal relative to the front lip of the base, the lid is pivotable through the hinge member with respect to the base between a vertically expanded open position and an expanded closed position and when the base of the detachable hinge component is slidably coupled to at least the second rail of the at least one of the second pair of opposing walls and the hinge component is located proximal relative to the front lip of the base, the lid is pivotable through the hinge member with respect to the base between a horizontally expanded open position and an expanded closed position. When the base of the detachable hinge component is slidably coupled to the at least first rail of the at least one of the first pair of opposing walls and located in a proximal position relative to the back side of the base of the electrical device cover, the lid is pivotable through the hinge member with respect to the base between a vertically collapsed open position and a collapsed closed position and when the base of the detachable hinge component is slidably coupled to the at least second rail of the at least one of the second pair of opposing walls and located in a proximal position relative to the back side of the base of the electrical device cover, the lid is pivotable through the hinge member with respect to the base between a horizontally collapsed open position and a collapsed closed position.

The lid further comprises a latching component that mates with a latch component on the base to secure the lid in a closed position. When the base of the detachable hinge component is slidably coupled to the at least first rail on the outer surface of one of the first pair of opposing walls, the lid is pivotable through the hinge member with respect to the base between an open position and a closed position that is between an expanded closed position and a collapsed closed position. When the base of the detachable hinge component is slidably coupled to the at least second rail on the outer surface of one of the second pair of opposing walls, the lid is pivotable through the hinge member with respect to the base between an open position and a closed position that is between an expanded closed position and a collapsed closed position. In another aspect, a method of adjustably covering an electrical receptacle comprises mounting a base of an electrical cover device to a wall surface, the base having at least one rail on an exterior surface of two perpendicular walls of the base that run perpendicular to the wall surface to which the base is mounted, securing a hinge component to the base by slidably coupling a base of a hinge component to at least one rail on a first perpendicular wall, and pivotally coupling a lid having at least one hinge tab to the hinge component by seating at least one hinge member of the hinge component within the at least one hinge tab such that the lid pivots between an expanded open position and an expanded closed position.

Particular implementations may include one or more of the following. The method may further comprise sliding the hinge component along the rail so that the hinge component is located in a proximal position relative to the back side of the base of the electrical device cover such that when the lid is pivotally coupled to the hinge component, the lid pivots between a collapsed open position and a collapsed closed position.

The method may further comprise slidably decoupling the base of the hinge component from the at least one rail on the first perpendicular wall, slidably coupling the base of the hinge component to the at least one rail on the second perpendicular wall, and pivotally coupling the lid to the hinge component such that the lid pivots between an expanded open position and an expanded closed position. The method may further comprise sliding the hinge component along the rail so that the hinge component is located in a proximal position relative to the back side of the base of the electrical device cover such that when the lid is pivotally coupled to the hinge component, the lid pivots between a collapsed open position and a collapsed closed position.

The method may also further comprise securing the lid to the base by mating a latch component on the lid with a latch component on the base. Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claims, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding may be derived by referring to the detailed description when considered in connection with the following illustrative figures. In the figures, like reference numbers refer to like elements or acts throughout the figures.

The electrical device cover will hereinafter be described in conjunction with the appended drawings, where like designations denote like elements, and:

FIGS. 1A-1B depict a perspective view of an electrical cover device hinged in vertical expanded closed and open positions.

Figure 2B:
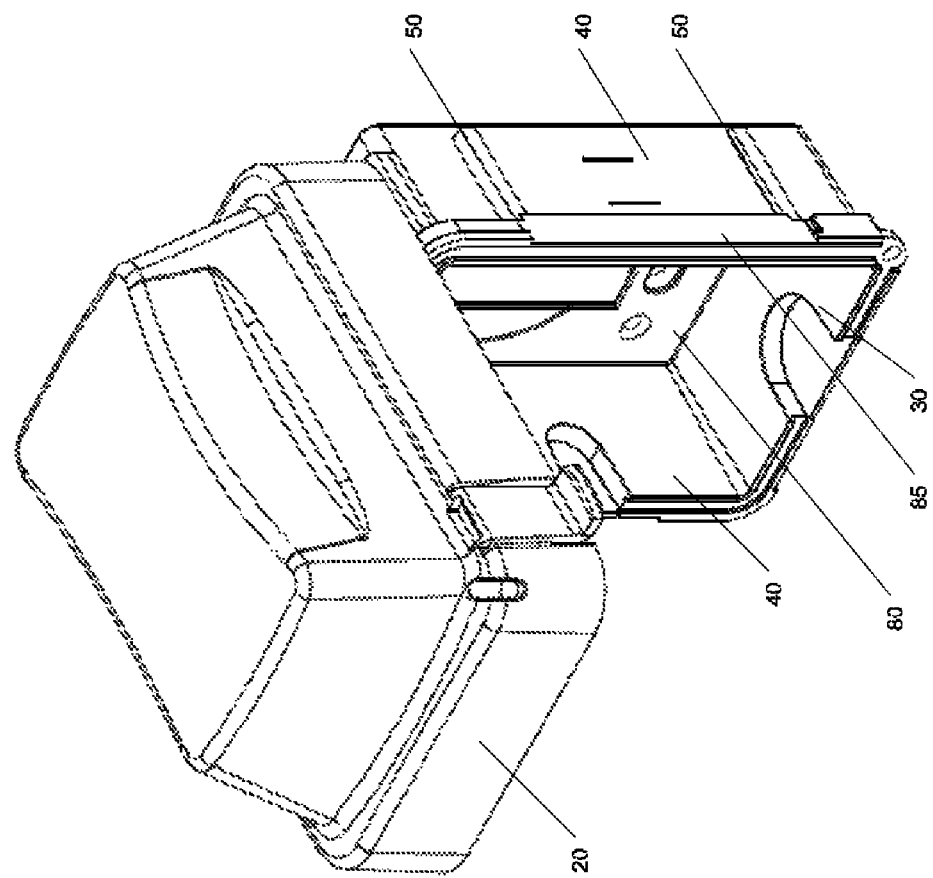
FIGS. 2A-2B depict a perspective view of an electrical cover device hinged in vertical collapsed closed and open positions.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects and implementations of the apparatus and methods. It will be understood, however, by those skilled in the relevant arts, that the present disclosure may be practiced without these specific details. In other instances, known structures and devices are shown or discussed more generally in order to avoid obscuring the aspects of this disclosure. In many cases, a description of the operation is sufficient to enable one to implement the various forms of the disclosure. It should be noted that there are many different and alternative configurations, devices and technologies to which the disclosed aspects may be applied. The full scope of the disclosure is not limited to the examples that are described below This disclosure, its aspects and implementations, are not limited to the specific components or assembly procedures disclosed herein. Many additional components and assembly procedures known in the art consistent with the intended operation and assembly procedures for an electrical device cover will become apparent for use with implementations of an electrical device cover from this disclosure. Accordingly, for example, although particular lids, bases, and hinge components are disclosed, such lids, bases, and hinge components and other implementing components may comprise any shape, size, style, type, model, version, measurement, concentration, material, quantity, and/or the like as is known in the art for such implementing components, consistent with the intended operation of an electrical device cover.

There are a variety of implementations of an electrical device cover assembly possible from the present disclosure. FIGS. 1A-8B illustrate some non-limiting examples of implementations of electrical device cover assemblies, but those of ordinary skill in the art will readily comprehend other particular implementations and variations from the disclosure provided in relation to the particular implementations provided here. Referring now to FIGS. 1A-4B, in one particular implementation, an electrical device cover 100 comprises a base 10 configured to mount to an electrical box. The base 10 comprises an opening in a back side 80 large enough to receive an electrical device, such as, by non-limiting example, an electrical outlet or switch of any of the conventional varieties found in the art. The base 10 also comprises a first pair of opposing walls 30, and a second pair of opposing walls 40 perpendicular to the first pair of opposing walls 30.

Examples of structures and configurations that may be used to enable electrical device covers to be interchangeably oriented horizontally or vertically while in use may be found in U.S. Pat. No. 7,071,415 to Shotey, et al. (issued Dec. 4, 2007) entitled "Horizontal and Vertical in-use Electrical Device Cover", the disclosure of which is hereby incorporated herein by reference for its descriptions relating to while-in-use electrical device covers. The exterior surfaces of at least one base wall includes one or more rails 50, grooves, or tracks (collectively "rails") that allow a detachable hinge component to slidably couple to the one or more rails. The rails 50 run perpendicular to the plane of the back side 80 of the base 10. Instead of, or in addition to, rails near the edges of the walls 30 and 40, it is contemplated that one or more rails may run near the center of the wall and fit into a track within the detachable hinge component.

Figure 3B:
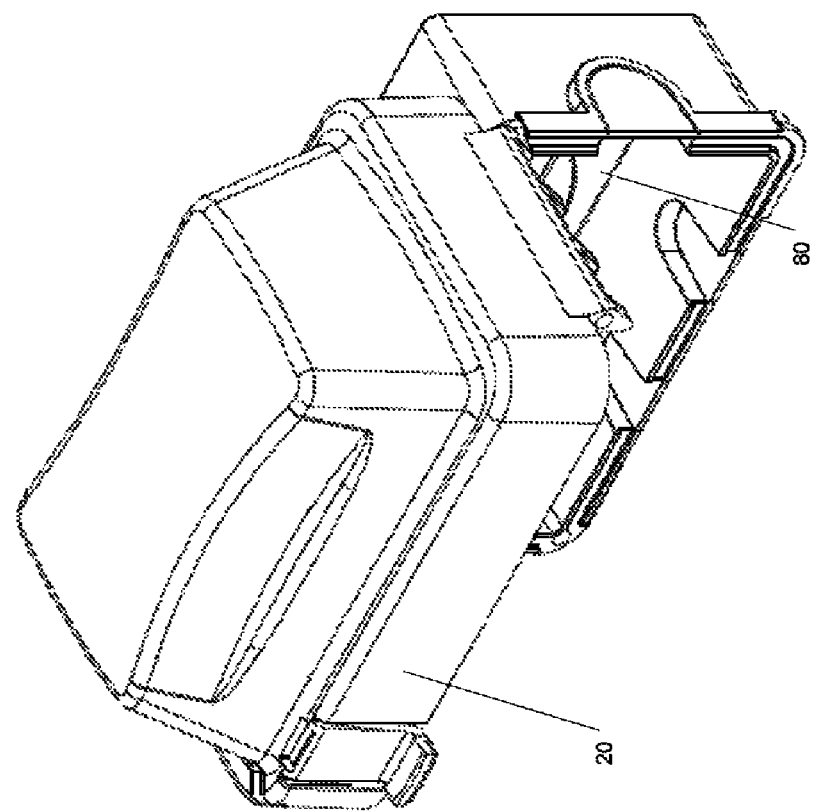
FIGS. 3A-3B depict a perspective view of an electrical cover device hinged in horizontal expanded closed and open positions.
Figure 3A:
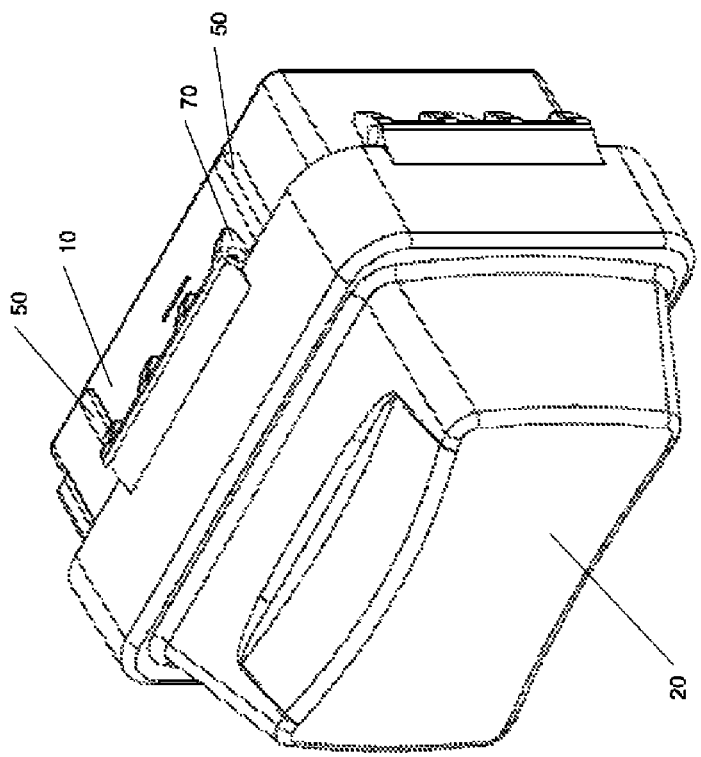

The detachable hinge component 90 has a base 110 and at least one hinge member 70 that is located parallel to the base of the detachable hinge component 90. The device further comprises a lid 20 that has at least one hinge tab 60 into which the hinge members 70 seat so as to pivotally couple the base 110 of the hinge component 90 to the lid 20. FIGS. 1A, 1B, 3A, and 3B provide illustrative examples of the hinge component being slidably coupled to one or more rails 50 so that the base 110 of the hinge component 90 slides along the one or more rails 50 which form a track or slot into which the base 110 of the hinge component 90 is mounted or housed. When positioned between the two rails 50, in a position that is distal relative to the back side 80 and proximal to the front lip 85 of the base 10, the lid 20 is pivotally coupled to the hinge component 90 such that the lid pivots between an expanded closed position and an expanded open position. As shown in FIGS. 1A and 1B, the rails 50 to which the hinge component 90 is slidably coupled may be located on an exterior surface of a wall of a first pair of opposing walls 30 of the base so that the orientation of the cover device 100 is vertical. Also, as illustrated in FIGS. 3A and 3B, the rails 50 to which the hinge component 90 is slidably coupled may be located on an exterior surface of a wall of the second pair of opposing walls 40 of the base so that the orientation of the cover device 100 is horizontal.

Figure 2A:
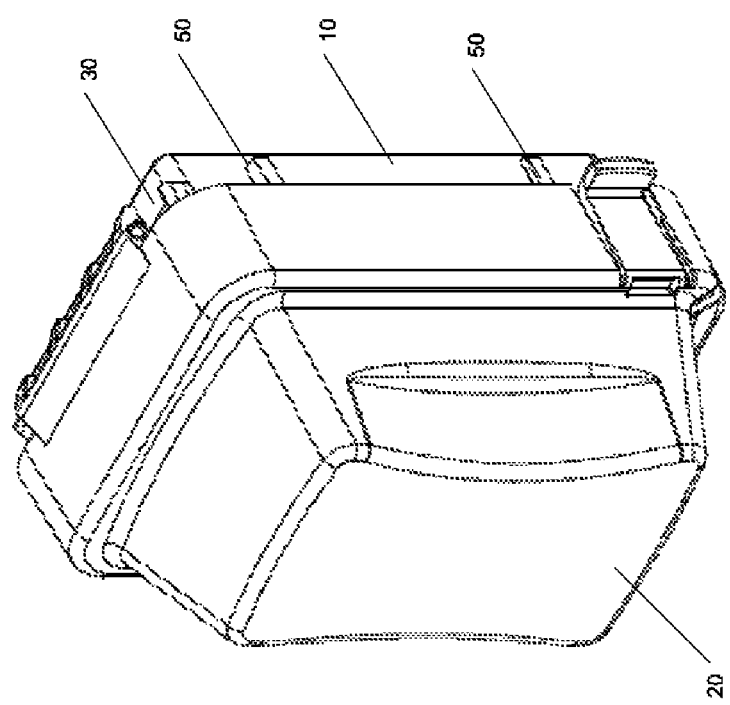
Figure 4B:
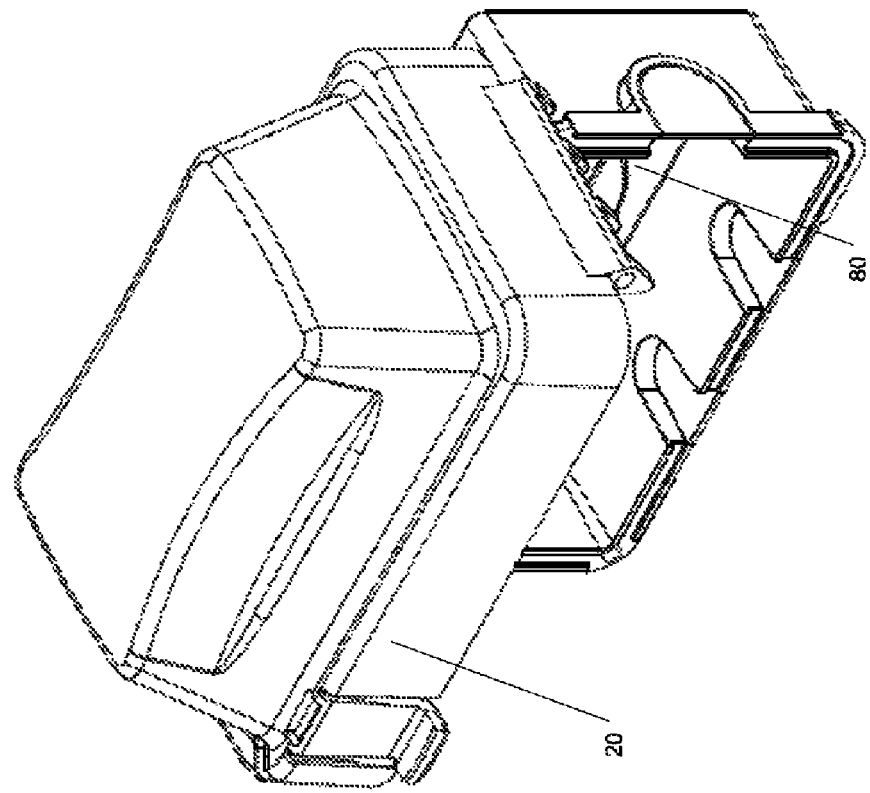
FIGS. 4A-4B depict a perspective view of an electrical cover device hinged in horizontal collapsed closed and open positions.
Figure 4A:
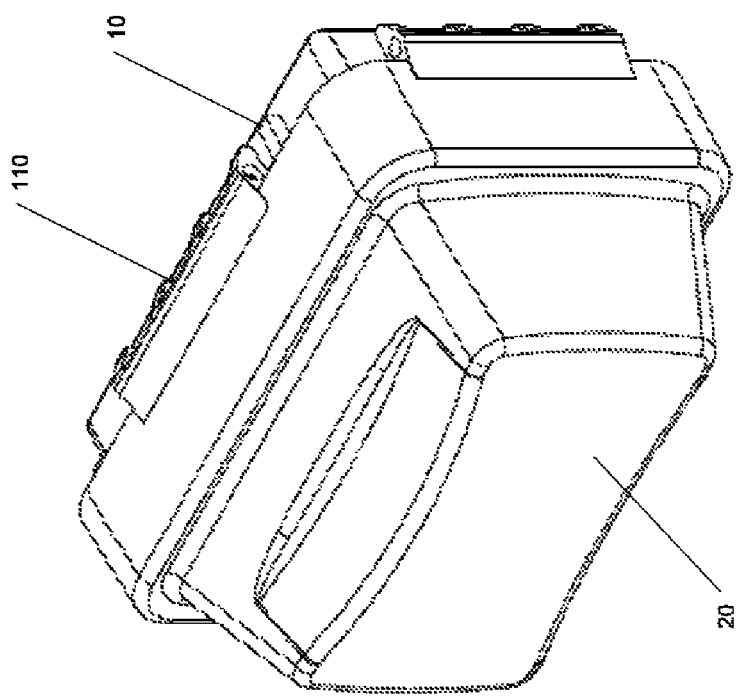

FIGS. 2A, 2B, 4A, and 4B illustrate the detachable hinge component 90 being slidably coupled to a rail 50 located on the exterior surface of a wall of a second pair of opposing walls 40 and to the wall surface itself to which the cover device 100 is mounted. This placement of the hinge component in a location proximal relative to the back side 80 of the base allows the lid 20 and hinge component 90 to be pivotally coupled so that the lid 20 pivots between a collapsed closed position and a collapsed open position. As to the embodiments disclosed herein, one of ordinary skill in the art would recognize that the number of rails on any side of the base is not limited to one or two, but may be any number of rails 50 that would provide for useful positioning of the hinge component 90 so that the lid 20 pivots between an expanded or collapsed open position and any position that may be between expanded and collapsed closed positions. As shown in FIGS. 2A and 2B, the rails 50 to which the hinge component 90 is slidably coupled may be located on an exterior surface of a wall of a second pair of opposing walls 40 of the base so that the orientation of the cover device 100 is vertical. Also, as illustrated in FIGS. 4A and 4B, the rails 50 to which the hinge component 90 is slidably coupled may be located on an exterior surface of a wall of a second pair of opposing walls 40 of the base so that the orientation of the cover device 100 is horizontal.

The expanded closed position may be preferable when the electrical outlet is in use as this position allows for maximum wire volume to pass through a cord port in the cover device 100. When the outlet is not in use, however, it may be preferable to position the detachable hinge component 90 so that the lid 20 is in the collapsed closed position as this position provides a "low profile" so as to be less obtrusive by protruding a lesser distance from the wall surface.

Figure 5:
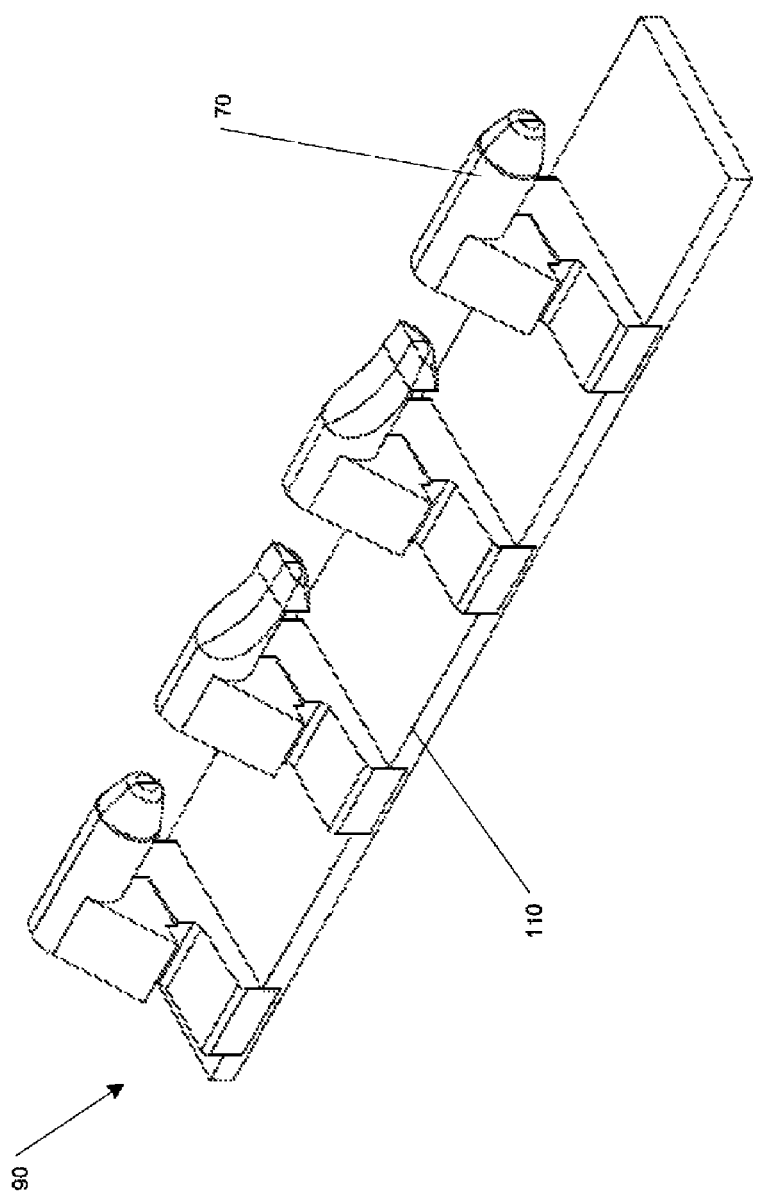
FIG. 5 depicts a hinge component.

FIG. 5 illustrates an implementation of a hinge component 90 having four hinge members 70 running parallel to the base 110 of the hinge component. Implementations need not be limited to four hinge members 70 as any number of hinge members 70 may be used, preferably a number equal to the number of hinge tabs 60 located on the lid 20. Alternate hinge styles and types may also be used. Additionally, for the particular implementations shown, the barrel portion of the pin and barrel hinge style shown may be on the slidably detachable hinge component 90 and the pin portion on the lid if desired for a particular arrangement.

Figure 6:
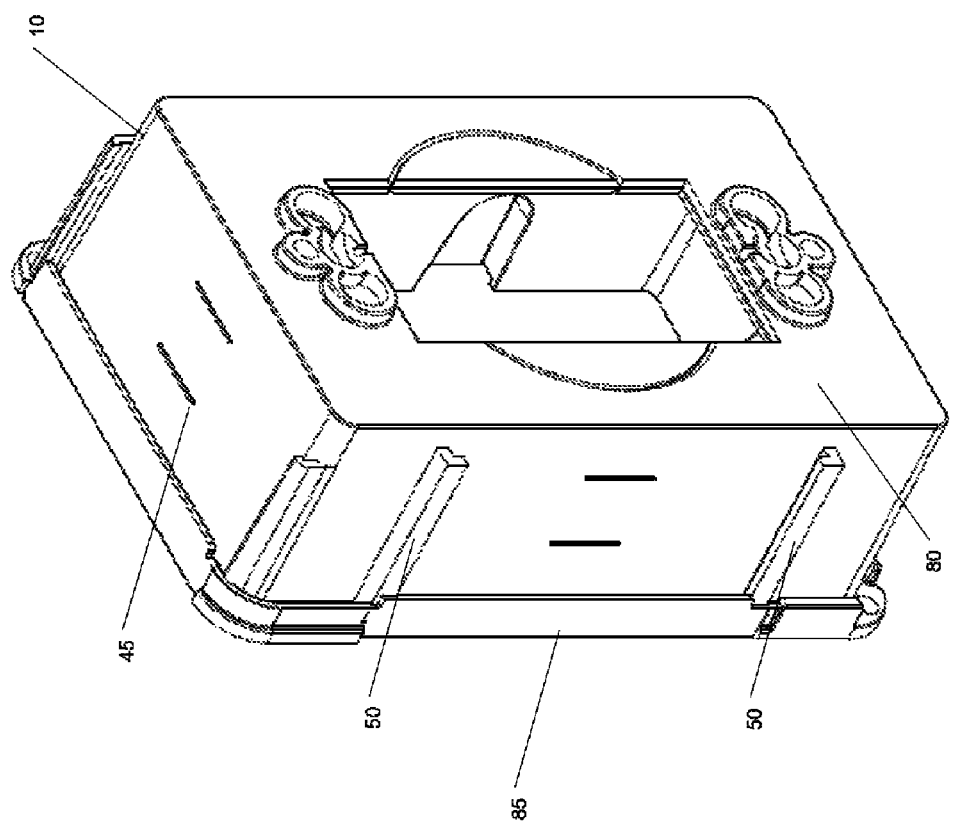
FIG. 6 depicts a base of an electrical cover device.

FIG. 6 depicts a rear view of the base 10 of an implementation of an electrical device cover 100. As shown, the base 10 has rails 50 located on exterior surfaces of perpendicular walls of the base so that the hinge component 90 may be slidably detached from a proximal or distal position relative to the back side 80 of the base 10 so as to allow for closing in expanded and collapsed positions. This allows for ease of installation of the electrical device cover 100 as contractors need only bring one type of cover to installations in the field because once a determination is made as to whether a horizontal or vertical installation is preferable, the detachable hinge component 90 may be slidably coupled to one or more of the rails 50 to allow the cover to be installed with its desired orientation and remain so that gravity can cause the cover device 100 to move from an open to a closed position. It also allows the lid to swing closed from a collapsed or an expanded position. One or more stops 45 may be located between the front lip 45 and the back side 80 of the base on an exterior surface of the wall. The one or more stops 45 may run parallel to the plane in which the back side 80 of the base 10 resides, or may comprise just single point bumps at some point along the travel path for the hinge component 90. The one or more stops 45 may provide slight resistance to indicate the preferred stopping point when the hinge component 90 is sliding along the rail 50.

Figure 7B:
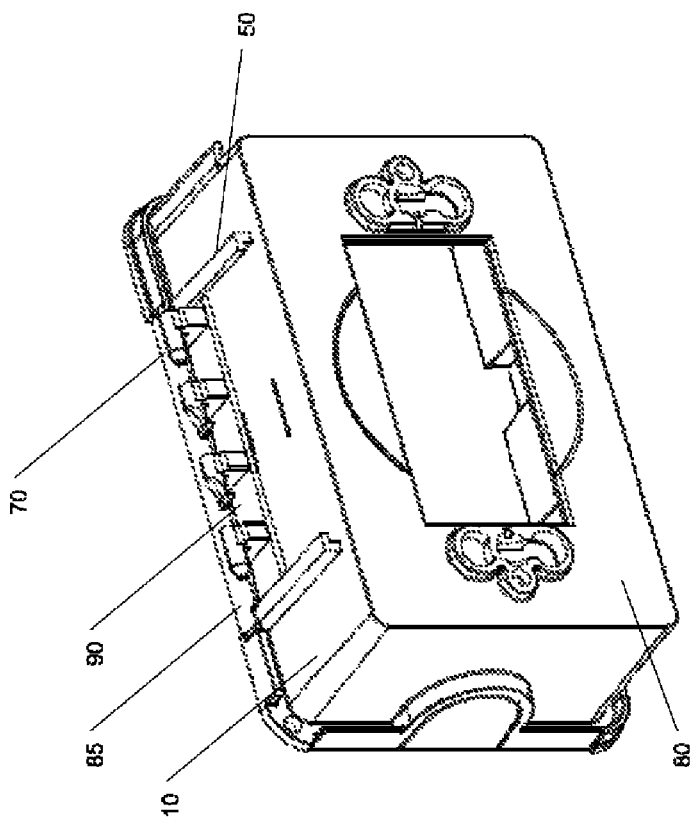
FIGS. 7A-7B depict a horizontal base with a hinge component in two different positions.
Figure 7A:
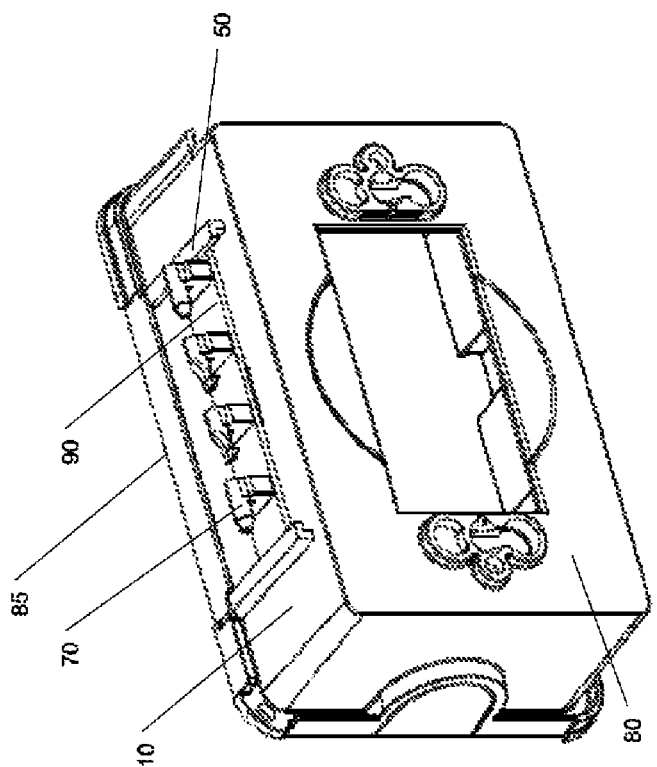

FIGS. 7A and 7B depict a rear view of a horizontally oriented base 10 of an electrical cover device 100. FIG. 7A shows a hinge component 90 slidably coupled in a proximal location relative to the back side 80 of the base 10 and FIG. 7B shows a hinge component 90 slidably coupled in a distal location relative to the back side 80 of the base 10. When a lid 20 (FIGS. 1-4) is pivotally coupled through the hinge members 70 seating within the hinge tabs 60 of the lid 20, i.e. the barrel portions of a pin and barrel hinge, this allows for the lid 20 to pivot between collapsed and expanded open, and collapsed and expanded closed positions.

Figure 8A:
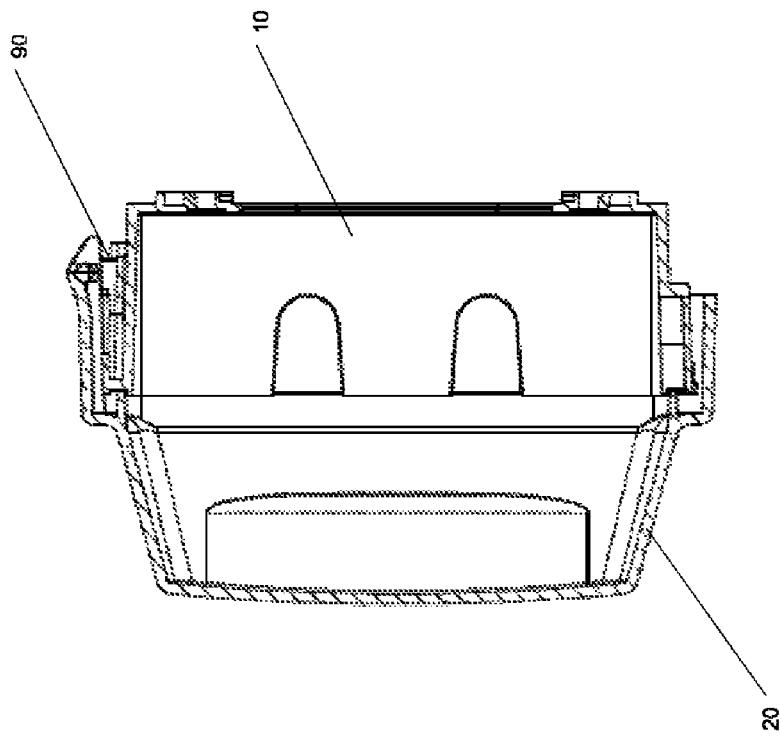
FIGS. 8A-8B depict cross-sectional side views of an electrical cover device.
Figure 8B:
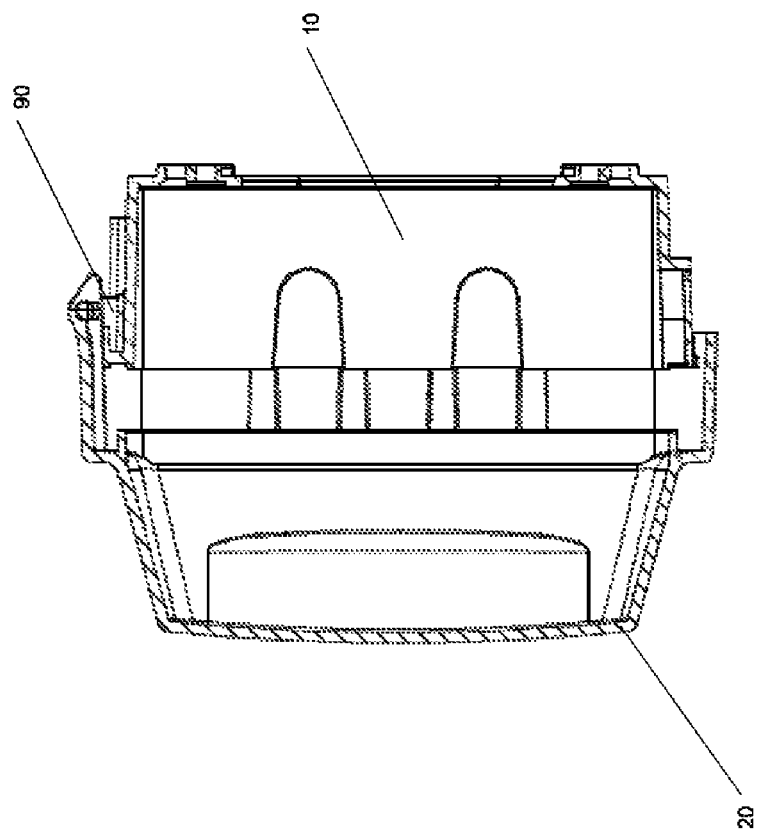

FIGS. 8A and 8B provide a cross-sectional side view of an electrical device cover 100, illustrating the difference in the distance that the lid 20 protrudes from the back side 80 of the base 10 for both distal (expanded closed position) and proximal (collapsed closed position) hinge component 90 placements, respectively. Thus, when the electrical outlet is not in use, the detachable hinge component 90 may be placed in its proximal (collapsed) position to minimize the cover's protrusion from the wall surface.

Any of the implementations described herein may also include one or more locking or latching components (not shown) so that the lid 20 and base 10 may be latched together in any of the possible closed positions.

It will be understood that implementations are not limited to the specific components disclosed herein, as virtually any components consistent with the intended operation of a method and/or system implementation for an electrical device cover may be utilized. Accordingly, for example, although particular lids, hinges, and bases may be disclosed, such components may comprise any shape, size, style, type, model, version, class, grade, measurement, concentration, material, weight, quantity, and/or the like consistent with the intended operation of a method and/or system implementation for an electrical device cover.

The concepts disclosed herein are not limited to the specific implementations shown herein. For example, it is specifically contemplated that the components included in a particular implementation of an electrical device cover may be formed of any of many different types of materials or combinations that can readily be formed into shaped objects and that are consistent with the intended operation of an electrical device cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical device covers, lids, bases, removable tabs, adapters, hinges, cord ports, and electrical devices, and any other components forming a particular implementation of an electrical device cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical device cover, comprising:
   a base having a wall structure comprising at least a first pair of opposing walls and a second pair of opposing walls located perpendicular to the first pair of opposing walls and an opening in a back side of the base large enough to receive an electrical device;
   at least one rail on an exterior surface of at least one wall of the first pair of opposing walls;

a detachable hinge component having a base that is slidably coupled to the at least one rail, the detachable hinge component further comprising at least one hinge member that is parallel to the base of the hinge component; and a lid comprising at least one hinge tab in which the at least one hinge member seats such the lid is pivotally coupled to the hinge component.

2. The electrical device cover of claim 1 further comprising at least one stop on an exterior surface of the at least one of the first pair of opposing walls, the at least one stop within a sliding travel path of the detachable hinge component.

3. The electrical device cover of claim 1 wherein when the base of the detachable hinge component is slidably coupled to the at least one rail and rests against a front lip of the base, the lid is pivotable through the hinge member with respect to the base between an expanded open position and an expanded closed position.

4. The electrical device cover of claim 1 wherein when the base of the detachable hinge component is slidably coupled to the at least one rail and located in a proximal position relative to the back side of the base of the electrical device cover, the lid is pivotable through the hinge member with respect to the base between a collapsed open position and a collapsed closed position.

5. The electrical device cover of claim 1 further comprising at least one second rail on an exterior surface of at least one of the second pair of opposing walls.

6. The electrical device cover of claim 5 wherein when the base of the detachable hinge component is slidably coupled to the at least one second rail and rests against a front lip of the base, the lid is pivotable through the hinge member with respect to the base between an expanded open position and an expanded closed position.

7. The electrical device cover of claim 5 wherein when the base of the detachable hinge component is slidably coupled to the at least one second rail and located in a proximal position relative to the back side of the base of the electrical device cover, the lid is pivotable through the hinge member with respect to the base between a collapsed open position and a collapsed closed position.

8. The electrical device cover of claim 1 wherein when the base of the detachable hinge component is slidably coupled to the at least one rail on the exterior surface of the at least one wall of the first pair of opposing walls and the detachable hinge member is located between a front lip of the base and a plane in which the back side of the base resides, the lid is pivotable through the hinge member with respect to the base between an open position and a closed position that is between an expanded closed position and a collapsed closed position;
at least one rail on an exterior surface of at least one wall of the first pair of opposing walls.

9. The electrical device of claim 1 further comprising at least one second rail on an exterior surface of at least one wall of the second pair of opposing walls, wherein when the base of the detachable hinge component is slidably coupled to the at least one second rail on the exterior surface of the at least one wall of the second pair of opposing walls and the detachable hinge member is located between a front lip of the base and a plane in which the back side of the base resides, the lid is pivotable through the hinge member with respect to the base between an open position and a closed position that is between an expanded closed position and a collapsed closed position.

10. The electrical device of claim 1 wherein the lid further comprises a latch component that mates with a latch component on the base to secure the lid in a closed position.

11. An electrical device cover, comprising:
a base having a wall structure comprised of at least a first pair of opposing walls and a second pair of opposing walls located perpendicular to the first pair of opposing walls and an opening in a back side large enough to receive an electrical device;

at least a first rail on an exterior surface of at least one wall of the first pair of opposing walls, the at least first rail running perpendicular to a plane in which the back side of the base resides;

at least a second rail on an exterior surface of at least one second wall of the second pair of opposing walls that is perpendicular to the at least one of the first pair of opposing walls, the at least second rail running perpendicular to a plane in which the back side of the base resides;

a detachable hinge component having a base that is slidably couplable to the least a first rail and the at least a second rail, the detachable hinge component further comprising at least one hinge member that is parallel to the base of the hinge component; and a lid comprising at least one hinge tab in which the at least one hinge member seats such the lid is pivotally coupled to the hinge component.

12. The electrical device cover of claim 11 wherein when the base of the detachable hinge component is slidably coupled to the at least a first rail of the at least one wall of the first pair of opposing walls and the hinge component is located proximal relative to a front lip of the base, the lid is pivotable through the hinge member with respect to the base between a vertically open position and an expanded closed position, and when the base of the detachable hinge component is slidably coupled to the at least a second rail of the at least one second wall of the second pair of opposing walls and the hinge component is located proximal relative to the front lip of the base, the lid is pivotable through the hinge member with respect to the base between a horizontally open position and an expanded closed position.

13. The electrical device cover of claim 11 wherein when the base of the detachable hinge component is slidably coupled to the at least a first rail of the at least one wall of the first pair of opposing walls and located in a proximal position relative to the back side of the base of the electrical device cover, the lid is pivotable through the hinge member with respect to the base between a vertically open position and a collapsed closed position, and when the base of the detachable hinge component is slidably coupled to the at least a second rail of the at least one second wall of the second pair of opposing walls and located in a proximal position relative to the back side of the base of the electrical device cover, the lid is pivotable through the hinge member with respect to the base between a horizontally open position and a collapsed closed position.

14. The electrical device of claim 11 wherein the lid further comprises a latching component that mates with a latch component on the base to secure the lid in a closed position.

15. The electrical device of claim 11 wherein when the base of the detachable hinge component is slidably coupled to the at least a first rail on the exterior surface of the at least one wall of the first pair of opposing walls, the lid is pivotable through the hinge member with respect to the base between an open position and a closed position that is between an expanded closed position and a collapsed closed position.

16. The electrical device of claim 11 wherein when the base of the detachable hinge component is slidably coupled to the at least a second rail on the exterior surface of the at least one second wall of the second pair of opposing walls, the lid is pivotable through the hinge member with respect to the base between an open position and a closed position that is between an expanded closed position and a collapsed closed position.

17. A method of adjustably covering an electrical receptacle comprising:
- mounting a base of an electrical cover device to a wall surface, the base having at least one rail on an exterior surface of at least one wall of at least two perpendicular walls of the base that run perpendicular to the wall surface to which the base is mounted, the base comprising at least two additional walls, each of which is positioned opposite one of the two perpendicular walls, the at least two perpendicular walls and the at least two additional walls defining base sides;
- securing a hinge component to the base by slidably coupling a hinge component base to the at least one rail on a first perpendicular wall of the two perpendicular walls; and
- pivotally coupling a lid having at least one hinge tab to the hinge component by seating at least one hinge member of the hinge component within the at least one hinge tab such that the lid pivots between an open position and an expanded closed position.

18. The method of claim 17 further comprising:
sliding the hinge component along the rail so that the hinge component is located in a proximal position relative to a back side of the base of the electrical device cover such that when the lid is pivotally coupled to the hinge component, the lid pivots between an open position and a collapsed closed position.

19. The method of claim 17 further comprising:
slidably decoupling the base of the hinge component from the at least one rail on the first perpendicular wall;
slidably coupling the base of the hinge component to at least one second rail on a second perpendicular wall of the two perpendicular walls; and
pivotally coupling the lid to the hinge component such that the lid pivots between an open position and an expanded closed position.

20. The method of claim 19 further comprising:
sliding the hinge component along the at least one second rail so that the hinge component is located in a proximal position relative to a back side of the base of the electrical device cover such that when the lid is pivotally coupled to the hinge component, the lid pivots between an open position and a collapsed closed position.

21. The method of claim 17, further comprising securing the lid to the base by mating a latch component on the lid with a latch component on the base.

* * * * *